(12) United States Patent
Wu et al.

(10) Patent No.: US 7,129,301 B2
(45) Date of Patent: Oct. 31, 2006

(54) METHOD FOR PREPARING A BIODEGRADABLE COPOLYESTER

(75) Inventors: Ru-Yu Wu, Tao Yuan (TW); Chih-Wei Chu, Chu Pei (TW); Li-Ling Chang, Taipei Hsien (TW); Yi-Hsuan Tang, Chung Li (TW); Ping-Sheng Lai, Kaohsiung (TW)

(73) Assignee: Far Eastern Textile Ltd., Taipei (TW)

( * ) Notice: Subject to any disclaimer, the term of this patent is extended or adjusted under 35 U.S.C. 154(b) by 0 days.

(21) Appl. No.: 11/116,199

(22) Filed: Apr. 28, 2005

(65) Prior Publication Data

US 2006/0155099 A1     Jul. 13, 2006

(30) Foreign Application Priority Data

Jan. 7, 2005    (TW) .............................. 94100476 A

(51) Int. Cl.
C08F 20/00      (2006.01)
C08G 63/02      (2006.01)

(52) U.S. Cl. ...................... 525/437; 528/277; 528/279; 528/281; 528/282; 528/285; 528/296; 528/298; 528/300; 528/302; 528/306; 528/307; 528/308; 528/308.6; 525/444

(58) Field of Classification Search ................ 528/277, 528/279, 281, 282, 285, 296, 300, 302, 306, 528/307, 308, 308.6; 525/437, 444
See application file for complete search history.

(56) References Cited

U.S. PATENT DOCUMENTS

| | | |
|---|---|---|
| 6,020,393 A | 2/2000 | Khemani |
| 6,399,716 B1 | 6/2002 | Chung et al. |
| 6,414,108 B1 * | 7/2002 | Warzelhan et al. .......... 528/272 |
| 6,713,595 B1 * | 3/2004 | Chung et al. ................ 528/279 |
| 2003/0036626 A1 * | 2/2003 | Hayes et al. ................. 528/272 |

* cited by examiner

Primary Examiner—Samuel A. Acquah
(74) Attorney, Agent, or Firm—Pillsbury Winthrop Shaw Pittman

(57) ABSTRACT

A method for preparing a biodegradable copolyester includes: (a) optionally preparing an aromatic prepolymer by reacting a first aromatic dicarboxylic compound with a first aliphatic glycol; (b) reacting the aromatic prepolymer with a second aromatic dicarboxylic compound and a second aliphatic glycol so as to form a first reaction product; (c) reacting the first reaction product with an aliphatic dicarboxylic compound so as to form a second reaction product; and (d) performing polycondensation of the second reaction product.

26 Claims, No Drawings

US 7,129,301 B2

METHOD FOR PREPARING A BIODEGRADABLE COPOLYESTER

CROSS-REFERENCE TO RELATED APPLICATION

This application claims priority of Taiwanese application no. 094100476, filed on Jan. 7, 2005.

BACKGROUND OF THE INVENTION

1. Field of the Invention

This invention relates to a method for preparing a biodegradable copolyester, more particularly to a method including a step of preparing an aromatic prepolymer in the preparation of a biodegradable copolyester, and the biodegradable copolyester prepared therefrom.

2. Description of the Related Art

Typical polyesters used for various products including synthetic fibers, moldings, formings, plastic films and textiles, etc., are high molecular weight aromatic polyesters. These aromatic polyesters are produced by esterification and condensation of terephthalic acid with ethylene glycol or terephthalic acid with butylene glycol. Although the aromatic polyesters thus formed have good processability, they are not degradable naturally and tend to cause environmental pollution.

For the purpose of environmental protection, many attempts have been made to use aliphatic polyesters instead. The aliphatic polyesters are biodegrable and will not pollute the environment. However, applications of the aliphatic polyesters have been limited because of their low heat resistance and unsatisfactory mechanical properties. In order to obtain polyesters that have both good physical properties and processability, it has been attempted to introduce an aryl functional group into molecules of the aliphatic polyesters, so as to impart biodegradable property to the aliphatic polyesters. Nevertheless, the biodegradable rate of the aliphatic polyesters decreases with an increase in the amount of the aryl group introduced to the molecules of the aliphatic polyesters.

U.S. Pat. No. 6,020,393, assigned to Eastman Chemical Company, describes a biodegradable random branched aliphatic-aromatic copolyester, which was prepared by transesterification of an aromatic diester, an aliphatic diester, and an aliphatic glycol in the presence of a branching agent, at a temperature ranging from 190° C. to 210° C., so as to obtain a transesterified product. Polycondensation of the transesterified product was then conducted at 250° C., under a vacuum of approximately 0.1 mmHg, so as to form the aliphatic-aromatic copolyester. The branching agent was used for increasing the length of the molecular chain of the aliphatic-aromatic copolyester. However, the biodegradable rate and elongation property of the copolyester decreased with an increase in the amount of side chains in the molecules of the copolyester.

U.S. Pat. No. 6,414,108, assigned to BASF Aktiengesellschaft, describes biodegradable polyether esters which were prepared by reacting adipic acid with 1,4-butylene glycol at a temperature ranging from 230° C. to 240° C., so as to form a prepolymer, and then adding dimethyl terephthalate and 1,4-butylene glycol to the prepolymer, so as to carry out polycondensation in a reduced pressure.

U.S. Pat. No. 6,399,716, assigned to IRE Chemical Ltd., describes a biodegradable copolyester resin composition prepared by the following four steps: (1) preparing an aliphatic prepolymer; (2) reacting the prepolymer with an aromatic dicarboxylic acid and an aliphatic glycol at a temperature ranging from 180° C. to 220° C.; (3) adding an aliphatic dicarboxylic acid to the reaction mixture at a temperature ranging from 150° C. to 180° C.; and (4) conducing polycondensation of the reaction mixture at a reduced pressure.

SUMMARY OF THE INVENTION

The object of the present invention is to provide a method for preparing a biodegradable copolyester that has excellent biodegradability property.

According to one aspect of this invention, a method for preparing a biodegradable copolyester includes: (a) preparing an aromatic prepolymer by reacting a first aromatic dicarboxylic compound with a first aliphatic glycol; (b) reacting the aromatic prepolymer with a second aromatic dicarboxylic compound and a second aliphatic glycol so as to form a first reaction product; (c) reacting the first reaction product with an aliphatic dicarboxylic compound so as to form a second reaction product; and (d) performing polycondensation of the second reaction product.

According to another aspect of this invention, a method for preparing a biodegradable copolyester consists essentially of: (a) reacting an aromatic dicarboxylic compound with an aliphatic glycol so as to form a first reaction product; (b) reacting the first reaction product with an aliphatic dicarboxylic compound so as to form a second reaction product; and (c) performing polycondensation of the second reaction product.

DETAILED DESCRIPTION OF THE PREFERRED EMBODIMENTS

The first preferred embodiment of the method for preparing a biodegradable copolyester according to this invention includes the steps of: (a) preparing an aromatic prepolymer by reacting a first aromatic dicarboxylic compound with a first aliphatic glycol; (b) reacting the aromatic prepolymer with a second aromatic dicarboxylic compound and a second aliphatic glycol so as to form a first reaction product; (c) reacting the first reaction product with an aliphatic dicarboxylic compound so as to form a second reaction product; and (d) performing polycondensation of the second reaction product.

In the first preferred embodiment of this invention, each of the first and second aromatic dicarboxylic compounds is independently selected from the group consisting of an aromatic dicarboxylic acid that is selected from the group consisting of 1,4-terephthalic acid, 1,3-terephthalic acid, 2,6-naphthalic acid, 1,5-naphthalic acid, and combinations thereof, and esterified derivatives thereof. Preferably, the first aromatic dicarboxylic compound is 1,3-terephthalic acid, and the second aromatic dicarboxylic compound is 1,4-terephthalic acid.

Preferably, the first aromatic dicarboxylic compound used in step (a) is present in an amount ranging from 30 mol % to 50 mol %, based on the total moles of the first aromatic dicarboxylic compound and the first aliphatic glycol, and the second aromatic dicarboxylic compound used in step (b) is present in an amount ranging from 30 mol % to 45 mol %, based on the total moles of the first and second aromatic dicarboxylic compounds and the first and second aliphatic glycols.

In addition, in the first preferred embodiment of this invention, each of the first and second aliphatic glycols is independently selected from the group consisting of ethylene glycol, diethylene glycol, propylene glycol, 1,3-propylene glycol, 2,2-dimethyl-1,3-propylene glycol, 1,3-butylene glycol, 1,4-butylene glycol, 1,5-pentanediol, 1,6-hexanediol, 2,2,4-trimethyl-1,6-hexanediol, thiodiethanol, 1,3-cyclohexanedimethanol, 1,4-cyclohexanedimethanol, 2,2,4,4-tetramethyl-1,3-cyclobutanediol, triethylene glycol, and tetraethylene glycol. Preferably, both the first and second aliphatic glycols are 1,4-butylene glycol.

It is noted that the aromatic prepolymer formed in the step (a) can be used as a reaction accelerator to enhance reactivity and reaction rate of the second aromatic dicarboxylic compound with the second aliphatic glycol.

Preferably, step (b) is performed at a temperature higher than 180° C. More preferably, step (b) is performed at a temperature ranging from 200° C. to 220° C. It is noted that step (b) should not be conducted at a temperature higher than 250° C., so as to avoid occurrence of yellowing.

Preferably, a third aliphatic glycol is further added in step (c) of the first preferred embodiment, so as to react with the first reaction product, the second aromatic dicarboxylic compound, and the second aliphatic glycol. The third aliphatic glycol may be the same as or different from the second aliphatic glycol, and may be selected from the group consisting of ethylene glycol, diethylene glycol, propylene glycol, 1,3-propylene glycol, 2,2-dimethyl-1,3-propylene glycol, 1,3-butylene glycol, 1,4-butylene glycol, 1,5-pentanediol, 1,6-hexanediol, 2,2,4-trimethyl-1,6-hexanediol, thiodiethanol, 1,3-cyclohexanedimethanol, 1,4-cyclohexanedimethanol, 2,2,4,4-tetramethyl-1,3-cyclobutanediol, triethylene glycol, and tetraethylene glycol. More preferably, the third aliphatic glycol is the same as the second aliphatic glycol, e.g., 1,4-butylene glycol.

Additionally, steps (b) and (d) can be carried out in the presence of suitable catalysts known in the art, as long as the selected catalysts are capable of achieving the required reaction rate. Preferably, step (b) is conducted in the presence of a first catalyst, and step (d) is conducted in the presence of a second catalyst. The first and second catalysts may be the same or different metal-containing compound(s) containing a metal selected from the group consisting of Ti, Sb, Mn, Al, Zn and alloys thereof. More preferably, both the first and second catalysts are Ti-containing compounds. More preferably, the first and second catalysts are both tetrabutyl orthotitanate.

Preferably, the first and second catalysts respectively used in steps (b) and (d) are present in an amount greater than 1000 ppm. More preferably, the first and second catalysts respectively used in steps (b) and (d) are present in an amount ranging from 1500 ppm to 3000 ppm.

Moreover, the aliphatic dicarboxylic compound may be selected from the group consisting of an aliphatic dicarboxylic acid that is selected from the group consisting of malonic acid, succinic acid, glutaric acid, adipic acid, pimelic acid, suberic acid, azelaic acid, sebacic acid, maleic acid, fumaric acid, 2,2-dimethyl glutaric acid, 1,3-cyclopentanedicarboxylic acid, 1,3-cyclohexanedicarboxylic acid, 1,4-cyclohexane-dicarboxylic acid, diglycolic acid, itaconic acid, 2,5-norbornanedicarboxylic acid, 4-(hydroxymethyl)-cyclohexanecarboxylic acid, hydroxypivalic acid, 6-hydroxyhexanoic acid, glycolic acid, lactic acid, and combinations thereof, and esterified derivatives thereof. Preferably, the aliphatic dicarboxylic compound is adipic acid.

Preferably, the aliphatic dicarboxylic compound used in step (c) is present in an amount ranging from 15 mol % to 30 mol %, based on the total moles of the first and second aromatic dicarboxylic compounds, the first and second aliphatic glycols, and the aliphatic dicarboxylic compound.

Preferably, step (c) is performed at a temperature higher than 160° C. More preferably, step (c) is performed at a temperature ranging from 160° C. to 200° C. It is noted that step (c) should not be conducted at a temperature higher than 210° C., so as to avoid production of side products.

Preferably, step (d) is performed at a temperature higher than 220° C. More preferably, step (d) is performed at a temperature ranging from 240° C. to 255° C.

The second preferred embodiment of the method for preparing a biodegradable copolyester according to this invention consists essentially of: (a) reacting an aromatic dicarboxylic compound with an aliphatic glycol so as to form a first reaction product; (b) reacting the first reaction product with an aliphatic dicarboxylic compound so as to form a second reaction product; and (c) performing polycondensation of the second reaction product.

The reaction steps and species of reactants involved in the second preferred embodiment are similar to those employed in the first preferred embodiment, except that step (a) of the first preferred embodiment is omitted.

Preferably, the aromatic dicarboxylic compound used in step (a) is present in an amount ranging from 30 mol % to 55 mol %, based on the total moles of the aromatic dicarboxylic compound and the aliphatic glycol.

Preferably, the aliphatic dicarboxylic compound used in step (b) is present in an amount ranging from 10 mol % to 50 mol %, based on the total moles of the aromatic dicarboxylic compound, the aliphatic glycol, and the aliphatic dicarboxylic acid or its esterifed derivative.

According to the present invention, biodegradable copolyester products prepared from the first and second preferred embodiments have a number average molecular weight greater than 25000 and a poly disperse index ($P_d$) higher than 1.5. More preferably, the biodegradable copolyester products prepared from the first and second preferred embodiments have a number average molecular weight ranging from 25000 to 50000. Most preferably, the biodegradable copolyester products prepared from the first and second preferred embodiments have a number average molecular weight ranging from 35000 to 45000. Additionally, the biodegradable copolyester products prepared from the first and second preferred embodiments have a melting point ranging from 60° C. to 225° C.

The biodegradable copolyester products obtained from the method according to the present invention can be directly utilized in any application that requires biodegradable materials. Preferably, the biodegradable copolyester products of the present invention are suitable for use in the manufacture of bags, films and disposable tableware.

For example, the biodegradable copolyester products obtained from the method according to the present invention can be blended or processed with other biodegradable materials so as to further improve mechanical or physical properties of the biodegradable copolyester products. The biodegradable materials include biodegradable copolyesters, such as polylactate (PLA) and polycaprolactone (PCL), and aliphatic polyesters, and natural polymers, such as starch, wood powders and cereals.

Alternatively, the biodegradable copolyester products obtained from the method according to the present invention can be added to other materials which have good mechanical or physical properties but are not biodegradable.

Many other variations, modifications, and alternative embodiments may be made in the described methods, by those skilled in the art, without departing from the concept of the present invention. Accordingly, it should be clearly understood that the methods referred to in the foregoing description and following examples are illustrative only and are not intended to impose limitations upon the scope of this invention.

EXAMPLES

Reactants:
1. 1,3-terephthalic acid: commercially obtained from A. G. International Chemical company, Inc. Japan;
2. Butylene glycol: commercially obtained from Dairen Chemical Corp.;
3. 1,4-terephthalic acid: commercially obtained from China American Petrochemical Co. Ltd., Taiwan;
4. Adipic acid: commercially obtained from E. I. Du Pont De Nemours and Company, U.S.A.; and
5. Tetrabutyl orthotitanate: commercially obtained from E. I. Du Pont De Nemours and Company, U.S.A.

Example 1

10.0 g of 1,3-terephthalic acid was mixed with 10.0 g of 1,4-butylene glycol. The reaction mixture was heated to 210° C. so as to perform esterification and produce an aromatic prepolymer. To the aromatic prepolymer, 166.0 g of 1,4-terephthalic acid, 200.0 g of butylene glycol, and 0.5 g of tetrabutyl orthotitanate were subsequently added. Esterification of the reaction mixture was conducted at a temperature of 210° C. for 1 hour, so as to obtain a first reaction product. To the first reaction product, 219.0 g of adipic acid and 160.0 g of 1,4-butylene glycol were added. Esterification of the reaction mixture was conducted at a temperature of 180° C. for 3 hours, so as to produce a second reaction product. To the second reaction product, 1.7 g of tetrabutyl orthotitanate was added. The reaction mixture was heated to 250° C. Polycondensation of the reaction mixture was conducted at a vacuum pressure less than 2 torr for 4 hours, so as to form a biodegradable copolyester product (m.p.:102° C., Mw: 70000, and Mn:35000).

Example 2

To 166.0 g of 1,4-terephthalic acid, 200.0 g of 1,4-butylene glycol and 0.5 g of tetrabutyl orthotitanate were added. Esterification of the reaction mixture was conducted at a temperature of 205° C. for 3.5 hours, so as to obtain a first reaction product. To the first reaction product, 219.0 g of adipic acid and 137.0 g of 1,4-butylene glycol were added. Esterification of the reaction mixture was conducted at a temperature of 180° C. for 3 hours, so as to produce a second reaction product. To the second reaction product, 1.7 g of tetrabutyl orthotitanate was added. The reaction mixture was heated to 250° C. Polycondensation of the reaction mixture was conducted at a vacuum pressure less than 2 torr for 4 hours, so as to form a biodegradable copolyester product (m.p.:106° C., Mw: 62000, and Mn:35000).

Example 3

To 166.0 g of 1,4-terephthalic acid, 200.0 g of 1,4-butylene glycol, 10.0 g of 1,3-terephthalic acid, and 0.5 g of tetrabutyl orthotitanate were added. Esterification of the reaction mixture was conducted at a temperature of 205° C. for 3.5 hours, so as to obtain a first reaction product. To the first reaction product, 219.0 g of adipic acid and 137.0 g of 1,4-butylene glycol were added. Esterification of the reaction mixture was conducted at a temperature of 180° C. for 3 hours, so as to produce a second reaction product. To the second reaction product, 1.7 g of tetrabutyl orthotitanate was added. The reaction mixture was heated to 250° C. Polycondensation of the reaction mixture was conducted at a vacuum pressure less than 2 torr for 4 hours, so as to form a biodegradable copolyester product (m.p.:103° C., Mw: 68000, and Mn:34000)

Example 4

To 13.200 kg of 1,4-terephthalic acid, 12.000 kg of 1,4-butylene glycol, 0.730 kg of 1,3-terephthalic acid, and 0.056 kg of tetrabutyl orthotitanate were added. Esterification of the reaction mixture was conducted at a temperature of 210° C. for 4 hours, so as to obtain a first reaction product. To the first reaction product, 9.500 kg of adipic acid and 9.500 kg of 1,4-butylene glycol were added. Esterification of the reaction mixture was conducted at a temperature of 180° C. for 4 hours, so as to produce a second reaction product. To the second reaction product, 0.092 kg of tetrabutyl orthotitanate was added. The reaction mixture was heated to 250° C. Polycondensation of the reaction mixture was conducted at a vacuum pressure less than 1 torr for 4 hours, so as to form a biodegradable copolyester product (m.p.: 140° C., Mw: 100000, and Mn: 40000).

The biodegradable copolyester product is subsequently subjected to a biodegradation test according to CNS 14432 (ISO 14855, ASTM D5338). The biodegradability data obtained from the biodegradation test, which are represented in terms of the percentage of conversion of organic carbon in the biodegradable copolyester product to $CO_2$, are shown in the following Table I.

TABLE I

|  | Example 4 | | | | | | |
| --- | --- | --- | --- | --- | --- | --- | --- |
|  | After 0 days | After 15 days | After 30 days | After 45 days | After 60 days | After 75 days | After 90 days |
| Biodegradability (% of $CO_2$) | 0 | 3.516 | 12.261 | 32.167 | 62.627 | 89.007 | 96.331 |

While the present invention has been described in connection with what is considered the most practical and preferred embodiments, it is understood that this invention is not limited to the disclosed embodiments but is intended to cover various arrangements included within the spirit and scope of the broadest interpretation and equivalent arrangements.

We claim:
1. A method for preparing a biodegradable copolyester, comprising:
    (a) preparing an aromatic prepolymer by reacting a first aromatic dicarboxylic compound with a first aliphatic glycol;

(b) reacting the aromatic prepolymer with a second aromatic dicarboxylic compound and a second aliphatic glycol so as to form a first reaction product;
(c) reacting the first reaction product with an aliphatic dicarboxylic compound so as to form a second reaction product; and
(d) performing polycondensation of the second reaction product.

2. The method as claimed in claim 1, wherein each of the first and second aromatic dicarboxylic compounds is independently selected from the group consisting of an aromatic dicarboxylic acid that is selected from the group consisting of 1,4-terephthalic acid, 1,3-terephthalic acid, 2,6-naphthalic acid, 1,5-naphthalic acid, and combinations thereof, and esterified derivatives thereof.

3. The method as claimed in claim 2, wherein the first aromatic dicarboxylic compound is 1,3-terephthalic acid, and the second aromatic dicarboxylic compound is 1,4-terephthalic acid.

4. The method as claimed in claim 1, wherein the first aromatic dicarboxylic compound used in step (a) is present in an amount ranging from 30 mol % to 50 mol %, based on the total moles of the first aromatic dicarboxylic compound and the first aliphatic glycol.

5. The method as claimed in claim 1, wherein the second aromatic dicarboxylic compound used in step (b) is present in an amount ranging from 30 mol % to 45 mol %, based on the total moles of the first and second aromatic dicarboxylic compounds and the first and second aliphatic glycols.

6. The method as claimed in claim 1, wherein each of the first and second aliphatic glycols is independently selected from the group consisting of ethylene glycol, diethyleneglycol, propyleneglycol, 1,3-propyleneglycol, 2,2-dimethyl-1,3-propylene glycol, 1,3-butylene glycol, 1,4-butylene glycol, 1,5-pentanediol, 1,6-hexanediol, 2,2,4-trimethyl-1,6-hexanediol, thiodiethanol, 1,3-cyclohexanedimethanol, 1,4-cyclohexanedimethanol, 2,2,4,4-tetramethyl-1,3-cyclobutanediol, triethylene glycol, and tetraethylene glycol.

7. The method as claimed in claim 1, wherein step (c) further includes adding a third aliphatic glycol.

8. The method as claimed in claim 7, wherein the third aliphatic glycol is selected from the group consisting of ethylene glycol, diethylene glycol, propylene glycol, 1,3-propylene glycol, 2,2-dimethyl-1,3-propylene glycol, 1,3-butylene glycol, 1,4-butylene glycol, 1,5-pentanediol, 1,6-hexanediol, 2,2,4-trimethyl-1,6-hexanediol, thiodiethanol, 1,3-cyclohexanedimethanol, 1,4-cyclohexanedimethanol, 2,2,4,4-tetramethyl-1,3-cyclobutanediol, triethylene glycol, and tetraethylene glycol.

9. The method as claimed in claim 8, wherein each of the second and third aliphatic glycols is 1,4-butylene glycol.

10. The method as claimed in claim 1, wherein step (b) is conducted in the presence of a first catalyst, and step (d) is conducted in the presence of a second catalyst, each of the first and second catalysts being a metal-containing compound which contains a metal selected from the group consisting of Ti, Sb, Mn, Al, Zn and alloys thereof.

11. The method as claimed in claim 10, wherein each of the first and second catalysts is tetrabutyl orthotitanate.

12. The method as claimed in claim 1, wherein the aliphatic dicarboxylic compound is selected from the group consisting of an aliphatic dicarboxylic acid that is selected from the group consisting of malonic acid, succinic acid, glutaric acid, adipic acid, pimelic acid, suberic acid, azelaic acid, sebacic acid, maleic acid, fumaric acid, 2,2-dimethyl glutaric acid, 1,3-cyclopentanedicarboxylic acid, 1,3-cyclohexanedicarboxylic acid, 1,4-cyclohexane-dicarboxylic acid, diglycolic acid, itaconic acid, 2,5-norbornanedicarboxylic acid, 4-(hydroxymethyl)-cyclohexanecarboxylic acid, hydroxypivalic acid, 6-hydroxyhexanoic acid, glycolic acid, lactic acid, and combinations thereof, and esterified derivatives thereof.

13. The method as claimed in claim 12, wherein the aliphatic dicarboxylic compound is adipic acid.

14. The method as claimed in claim 1, wherein the aliphatic dicarboxylic compound used in step (c) is present in an amount ranging from 15 mol % to 30 mol %, based on the total moles of the first and second aromatic dicarboxylic compounds, the first and second aliphatic glycols, and the aliphatic dicarboxylic compound.

15. A method for preparing a biodegradable copolyester, consisting essentially of:
(a) reacting an aromatic dicarboxylic compound with an aliphatic glycol so as to form a first reaction product;
(b) reacting the first reaction product with an aliphatic dicarboxylic compound so as to form a second reaction product; and
(c) performing polycondensation of the second reaction product.

16. The method as claimed in claim 15, wherein the aromatic dicarboxylic compound is selected from the group consisting of an aromatic dicarboxylic acid that is selected from the group consisting of 1,4-terephthalic acid, 1,3-terephthalic acid, 2,6-naphthalic acid, 1,5-naphthalic acid, and combinations thereof, and esterified derivatives.

17. The method as claimed in claim 16, wherein the aromatic dicarboxylic compound is 1,4-terephthalic acid.

18. The method as claimed in claim 15, wherein the aromatic dicarboxylic compound used in step (a) is present in an amount ranging from 30 mol % to 55 mol %, based on the total moles of the aromatic dicarboxylic compound and the aliphatic glycol.

19. The method as claimed in claim 15, wherein the aliphatic glycol is selected from the group consisting of ethylene glycol, diethylene glycol, propylene glycol, 1,3-propylene glycol, 2,2-dimethyl-1,3-propylene glycol, 1,3-butylene glycol, 1,4-butylene glycol, 1,5-pentanediol, 1,6-hexanediol, 2,2,4-trimethyl-1,6-hexanediol, thiodiethanol, 1,3-cyclohexane dimethanol, 1,4-cyclohexanedimethanol, 2,2,4,4-tetramethyl-1,3-cyclobutanediol, triethylene glycol, and tetraethylene glycol.

20. The method as claimed in claim 15, wherein step (a) is conducted in the presence of a first catalyst, and step (b) is conducted in the presence of a second catalyst, each of the first and second catalysts being a metal-containing compound which contains a metal selected from the group consisting of Ti, Sb, Mn, Al, Zn and alloys thereof.

21. The method as claimed in claim 20, wherein each of the first and second catalysts is tetrabutyl orthotitanate.

22. The method as claimed in claim 15, wherein the aliphatic dicarboxylic compound is selected from the group consisting of an aliphatic dicarboxylic acid that is selected from the group consisting of malonic acid, succinic acid, glutaric acid, adipic acid, pimelic acid, suberic acid, azelaic acid, sebacic acid, maleic acid, fumaric acid, 2,2-dimethyl glutaric acid, 1,3-cyclopentanedicarboxylic acid, 1,3-cyclohexane-dicarboxylic acid, 1,4-cyclohexanedicarboxylic acid, diglycolic acid, itaconic acid, 2,5-norbornane-dicarboxylic acid, 4-(hydroxymethyl)cyclohexane-carboxylic acid, hydroxypivalic acid, 6-hydroxyhexanoic acid, glycolic acid, lactic acid, and combinations thereof, and esterified derivatives thereof.

23. The method as claimed in claim 22, wherein the aliphatic dicarboxylic acid is adipic acid.

24. The method as claimed in claim 15, wherein the aliphatic dicarboxylic compound used in step (b) is present in an amount ranging from 10 mol % to 50 mol %, based on the total moles of the aromatic dicarboxylic compound, the aliphatic glycol, and the aliphatic dicarboxylic acid or its esterifed derivative.

25. A biodegradable copolyester having a number average molecular weight ranging from 25000 to 50000 and a melting point ranging from 60° C. to 225° C., said biodegradable copolyester being formed according to the method as claimed in claim 1.

26. A biodegradable copolyester having a number average molecular weight ranging from 25000 to 50000 and a melting point ranging from 60° C. to 225° C., said biodegradable copolyester being formed according to the method as claimed in claim 15.

* * * * *